(12) United States Patent
Gross et al.

(10) Patent No.: US 7,613,576 B2
(45) Date of Patent: Nov. 3, 2009

(54) USING EMI SIGNALS TO FACILITATE PROACTIVE FAULT MONITORING IN COMPUTER SYSTEMS

(75) Inventors: Kenny C. Gross, San Diego, CA (US); Aleksey M. Urmanov, San Diego, CA (US); Ramakrishna C. Dhanekula, San Diego, CA (US); Steven F. Zwinger, Poway, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 211 days.

(21) Appl. No.: 11/787,003

(22) Filed: Apr. 12, 2007

(65) Prior Publication Data

US 2008/0256398 A1 Oct. 16, 2008

(51) Int. Cl.
*G06F 11/30* (2006.01)
(52) U.S. Cl. ............... 702/57; 702/77; 702/115; 324/628; 324/76.21; 714/47
(58) Field of Classification Search ............. 702/57–59, 702/182, 185, 76–77, 115; 324/627, 72, 324/537, 750, 763, 628, 76.21; 714/47–48
See application file for complete search history.

(56) References Cited

U.S. PATENT DOCUMENTS

| 6,296,205 | B1 | 10/2001 | Hanson et al. |
| 2003/0204743 | A1 | 10/2003 | Davadas et al. |
| 2006/0043979 | A1 | 3/2006 | Wu |

FOREIGN PATENT DOCUMENTS

| WO | 03102610 A2 | 12/2003 |
| WO | 2007021392 A2 | 2/2007 |

OTHER PUBLICATIONS

Agilent Technologies; Agilent Spectrum Anaylsis Basics, Application Note 150, XP-002488439: http://www-csite.deis.unibo.it/Staff/giorgetti/lens/materiale/Agilent_Spec_Analyzer_5952-0292.pdf.
Parrish, Jr. et al., An Adaptive Pattern Analysis System for Isolating EMI*, Pattern Recognition vol. 19, Issue 5 (1986) pp. 397-406, ISSN:0031-3203 XP-000818732.
Gross, Kenny et al., "Proactive Detection of Software Aging Mechanisms in Performance Critical Computers", Proceedings of the 27th Annual NASA Goddard/IEEE Software Engineering Workshop (SEW-27'02) 0-7695-1855-Sep. 2003.
Gribok, Andrei et al., "Use of Kernel Based Techniques for Sensor Validation in Nuclear Power Plants", pp. 1-15, International Topical Meeting on Nuclear Plant Instrumentation, Controls, and Human-Machine Interface Technologies (NPIC&HMIT 2000) Washington DC. Nov. 2000, XP008098438.

*Primary Examiner*—Drew A Dunn
*Assistant Examiner*—Hien X Vo
(74) *Attorney, Agent, or Firm*—Park, Vaughan & Fleming LLP

(57) ABSTRACT

A system that monitors electromagnetic interference (EMI) signals to facilitate proactive fault monitoring in a computer system is presented. During operation, the system receives EMI signals from one or more antennas located in close proximity to the computer system. The system then analyzes the received signals to proactively detect anomalies during operation of the computer system.

13 Claims, 8 Drawing Sheets

USING EMI SIGNALS TO FACILITATE PROACTIVE FAULT MONITORING IN COMPUTER SYSTEMS

RELATED APPLICATION

The subject matter of this application is related to the subject matter in a co-pending non-provisional application by inventors Kenny C. Gross, Aleksey M. Urmanov and Ramakrishna C. Dhanekula entitled, "Method and Apparatus for Generating an Electromagnetic Interference Fingerprint for a Computer System," having Ser. No. 11/787/027, and filing date 12 Apr. 2007.

BACKGROUND

1. Field of the Invention

The present invention generally relates to techniques for proactive fault-monitoring in computer systems. More specifically, the present invention relates to a method and an apparatus that monitors electromagnetic interference (EMI) to facilitate proactive fault monitoring in computer systems.

2. Related Art

An increasing number of businesses are using computer systems for mission-critical applications. In such applications, a component failure can have a devastating effect on the business. For example, the airline industry is critically dependent on computer systems that manage flight reservations, and would essentially cease to function if these systems failed. Hence, it is critically important to be able to monitor the health of a computer system so that proactive actions can be taken to prevent a catastrophic failure of these computer systems.

SUMMARY

One embodiment of the present invention provides a system that monitors electromagnetic interference (EMI) signals to facilitate proactive fault monitoring in a computer system. During operation, the system receives EMI signals from one or more antennas located in close proximity to the computer system. The system then analyzes the received signals to proactively detect anomalies during operation of the computer system.

In one embodiment, while analyzing the received signals, the system uses a Fast Fourier Transform (FFT) to convert the received signals to the frequency domain. Next, the system converts the output of the FFT into time series frequency signals for different frequencies. The system then analyzes the time series frequency signals to detect anomalies.

In one embodiment, the process of analyzing the time series frequency signals involves a training phase and a monitoring phase. During the training phase, the system uses the time series frequency signals and other telemetry signals to construct a model. Next, during the monitoring phase, the system then compares the time series frequency signals with corresponding estimated time series signals produced by the model to detect anomalies.

In one embodiment, while using the time series frequency signals and the other telemetry signals to construct the model, the system determines correlations between the time series frequency signals and the other system telemetry signals to identify time series frequency signals which are highly correlated with the other telemetry signals. The system then constructs the model by determining correlations between a set of signals, wherein the set of signals includes the identified time series frequency signals and the other telemetry signals.

In one embodiment, the system uses a non-linear, non-parametric regression technique to determine the correlations.

In one embodiment, the non-linear, non-parametric regression technique can include a multivariate state estimation technique.

In one embodiment, the system uses sequential detection techniques to detect anomalies while comparing the time series frequency signals with corresponding estimated time series signals during the monitoring phase.

In one embodiment, the sequential detection techniques include the Sequential Probability Ratio Test (SPRT).

In one embodiment, the other system telemetry signals can include: internal performance signals containing parameters maintained by software within the computer system; physical performance signals measured through sensors located in proximity to the computer system; and canary performance signals containing parameters associated with synthetic user transactions periodically generated for performance measuring purposes.

DETAILED DESCRIPTION

Figure 1:
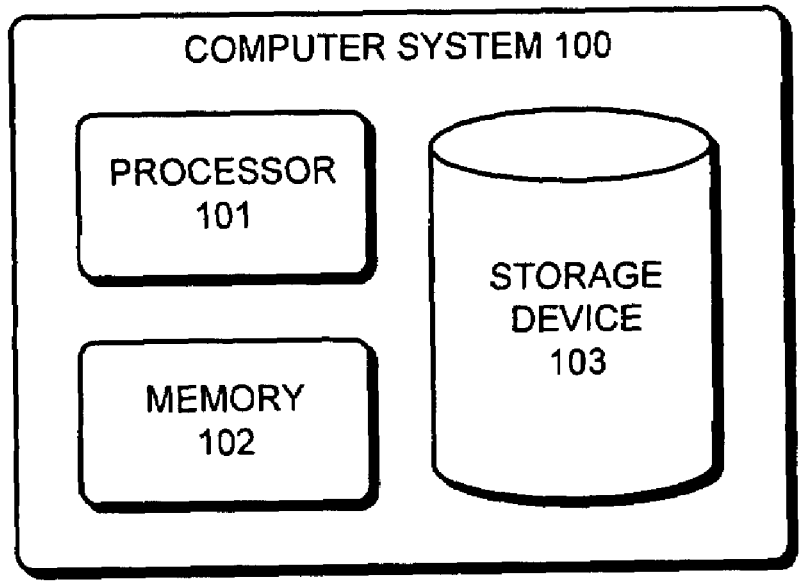
FIG. 1 illustrates a computer system.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Electromagnetic interference (EMI) signals are generated by computer systems during operation. These EMI signals are commonly regarded as noise and computer systems are often shielded to minimize the amount of EMI signals emitted by the computer system. However, these EMI signals can also carry information about the health of the computer system. Hence, one embodiment of the present invention uses these EMI signals to facilitate proactive fault monitoring of computer systems.

In one embodiment of the present invention, EMI time-series signals from the computer system are transformed to the frequency domain. The amplitudes of frequency domain representations of the EMI time-series signals are observed over time. These amplitudes tend to be well correlated with physical and soft telemetry signals obtained from sensors within the computer system and can be used for proactive fault monitoring purposes. Note that soft telemetry signals can include operating system metrics related to loads and throughputs, whereas the physical telemetry signals can include signals obtained from physical sensors such as accelerometers, voltage sensors, and temperature sensors.

One embodiment of the present invention supplements the physical and soft telemetry signals with the EMI signals to facilitate proactive fault monitoring. In this embodiment, the EMI signals, physical and soft telemetry signals are used as inputs to an advanced pattern recognition technique (described below). Using physical and soft telemetry signals in conjunction with EMI signals can substantially improve the accuracy of proactive fault monitoring for a computer system.

In one embodiment of the present invention, only the EMI signals are used for proactive fault monitoring. In this embodiment, the physical and soft telemetry signals are not used for proactive fault monitoring purposes.

Using EMI signals for proactive fault monitoring is beneficial because the EMI signals:

(1) are reproducible when performing the same workload;
(2) are well correlated with physical and soft telemetry signals; and
(3) substantially enhance the sensitivity and false-alarm avoidance during the proactive fault monitoring process.

Computer System

FIG. 1 illustrates a computer system 100. Computer system 100 includes processor 101, memory 102, and storage device 103.

Processor 101 can generally include any type of processor, including, but not limited to, a microprocessor, a mainframe computer, a digital signal processor, a personal organizer, a device controller, a computational engine within an appliance, and any other processor now known or later developed. Furthermore, processor 101 can include one or more cores.

Although FIG. 1 illustrates computer system 100 with one processor, computer system 100 can include more than one processor. In a multi-processor configuration, the processors can be located on a single system board, or multiple system boards.

Memory 102 can include any type of memory, including but not limited to, dynamic random access memory (DRAM), static random access memory (SRAM), flash memory, read only memory (ROM), and any other type of memory now known or later developed.

Storage device 103 can include any type of storage device that can be coupled to a computer system. This includes, but is not limited to, magnetic, optical, magneto-optical storage devices, storage devices based on flash memory and/or battery-backed up memory, and any other storage device now known or later developed.

Note that during operation, computer system 100 generates electromagnetic interference (EMI) signals.

EMI Signals for Proactive Fault Monitoring

Figure 2:
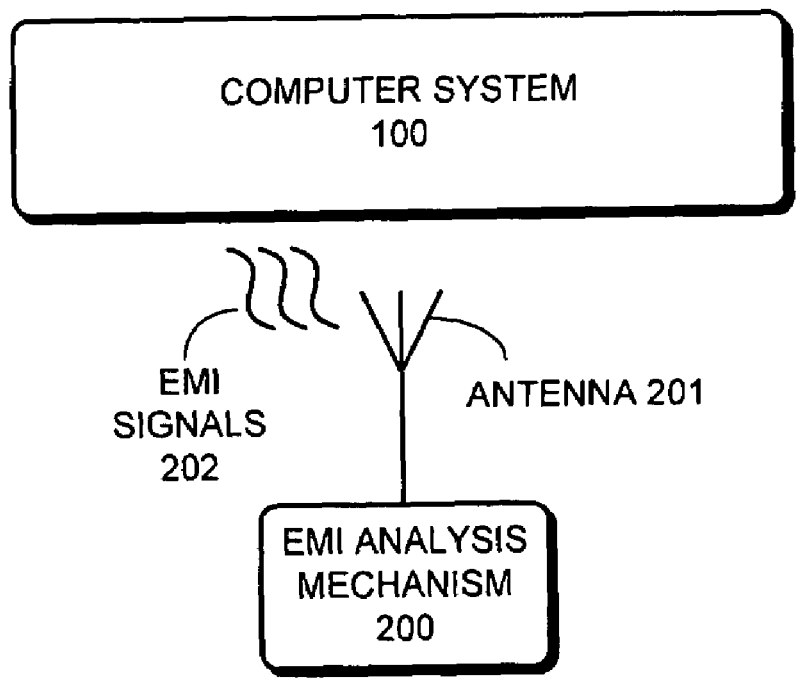
FIG. 2 illustrates an electromagnetic interference (EMI) analysis mechanism in accordance with an embodiment of the present invention.

FIG. 2 illustrates an EMI analysis mechanism 200 in accordance with an embodiment of the present invention. In one embodiment of the present invention, EMI analysis mechanism 200 is coupled to antenna 201.

In one embodiment of the present invention, EMI analysis mechanism 200 is located within computer system 100. In another embodiment, EMI analysis mechanism 200 is coupled to computer system 100. For example, EMI analysis mechanism 200 can be coupled to computer system 100 using a wired or a wireless network, or a direct connection though a cable. In another embodiment of the present invention, some of the components within EMI analysis mechanism 200 are located within computer system 100 and some of the components within EMI analysis mechanism 200 are located outside of computer system 100.

In one embodiment of the present invention, EMI analysis mechanism 200 is included in a real-time telemetry system, which is described in more detail below.

In one embodiment of the present invention, EMI analysis mechanism 200 receives and amplifies EMI signals 202 generated by computer system 100.

Antenna 201 can generally include any type of antenna such as:. a dipole antenna, a Yagi-Uda antenna, a loop antenna, an electrical short antenna (e.g., an open-ended a wire less than a quarter wavelength), a fractal antenna, a parabolic antenna, a microstrip antenna, a quad antenna, a random wire antenna (e.g., an open-ended wire greater than one wavelength), a beverage antenna, a helical antenna, a phased array antenna, or any other type of antenna now known or later developed.

In one embodiment of the present invention, antenna 201 comprises an insulated wire with a fixed length of the insulation stripped off of the insulated wire. In this embodiment, the stripped end of the insulated wire is open to free space and the other end of the wire is coupled to EMI analysis mechanism 200.

In one embodiment of the present invention, the antenna is placed inside of the chassis for computer system 100. In another embodiment of the present invention, the antenna is placed outside of the chassis for computer system 100.

In one embodiment of the present invention, the antenna is placed a specified distance from a central processing unit (CPU) for the computer system. In another embodiment, multiple antennas are located within a specified distance from the CPUs of a multiprocessor computer system. For example, one antenna can be located within a specified distance of each CPU. In another embodiment, one antenna is located within a specified distance of each core in a multi-core CPU.

In one embodiment of the present invention, antennas are located at various locations within the computer system.

The operation of analysis mechanism 200 is described below with reference to FIGS. 3-6.

Figure 3:
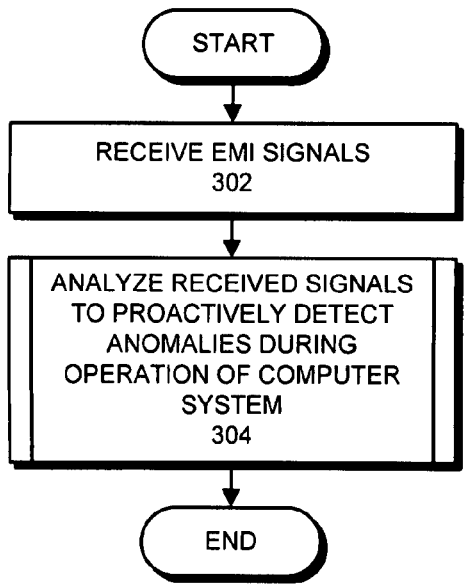
FIG. 3 presents a flow chart illustrating the process of monitoring EMI signals to facilitate proactive fault monitoring in a computer system in accordance with an embodiment of the present invention.

FIG. 3 presents a flow chart illustrating the process of monitoring EMI signals to facilitate proactive fault monitoring in a computer system in accordance with an embodiment of the present invention. The process begins when the system receives EMI signals from one or more antennas located in close proximity to the computer system (step 302). The system then analyzes the received signals to proactively detect anomalies during operation of the computer system (step 304). Note that step 304 is described in more detail with reference to FIG. 4.

Figure 4:
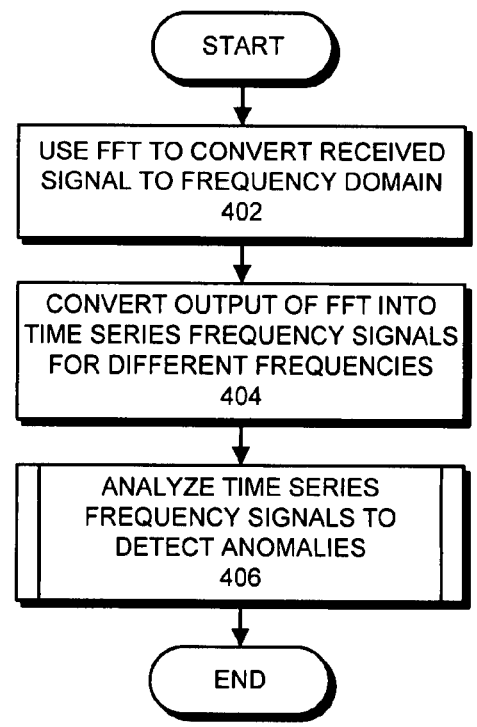
FIG. 4 presents a flow chart illustrating the process of analyzing received EMI signals in accordance with an embodiment of the present invention.

FIG. 4 presents a flow chart illustrating the process of analyzing received EMI signals in accordance with an embodiment of the present invention. The process begins when the system uses a Fast Fourier Transform (FFT) to convert the received signals to the frequency domain (step 402). Note that other transforms presently known or later developed can also be used. Next, the system converts the output of the FFT into time series frequency signals for different frequencies (step 404). The system then analyzes the time series frequency signals to detect anomalies (step 406). Step 406 is described in more detail with reference to FIG. 5.

Figure 5:
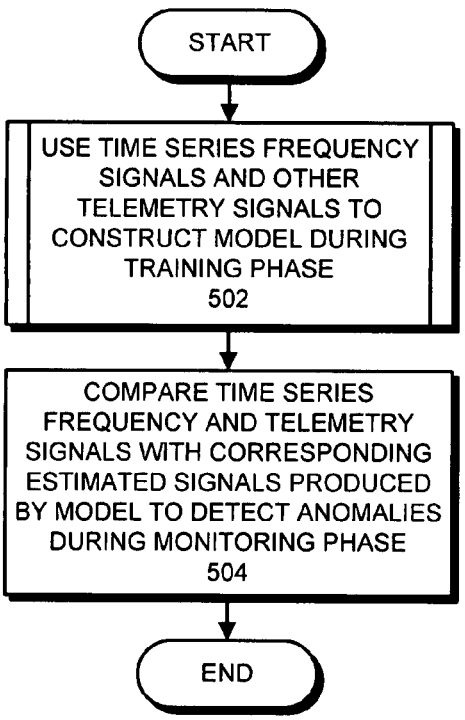
FIG. 5 presents a flow chart illustrating the process of analyzing EMI time series frequency signals in accordance with an embodiment of the present invention.

FIG. 5 presents a flow chart illustrating the process of analyzing time series frequency signals in accordance with an embodiment of the present invention. The process begins when the system uses the time series frequency signals and other telemetry signals to construct a model during a training phase (step 502). Step 502 is described in more detail below with reference to FIG. 6. In one embodiment of the present invention, the other system telemetry signals can include: internal performance signals containing parameters maintained by software within the computer system; physical performance signals measured through sensors located in proximity to the computer system; and canary performance signals containing parameters associated with synthetic user transactions periodically generated for performance measuring purposes.

Returning to FIG. 5, the system then compares time-series frequency and telemetry signals with corresponding estimated signals produced by model to detect anomalies during the monitoring phase (step 504). In one embodiment of the present invention, the system uses sequential detection techniques to detect anomalies while comparing the time series frequency signals with corresponding estimated time series signals during the monitoring phase. In one embodiment of the present invention, the sequential detection techniques include the Sequential Probability Ratio Test (SPRT). Note that the SPRT is described in more detail below.

Figure 6:
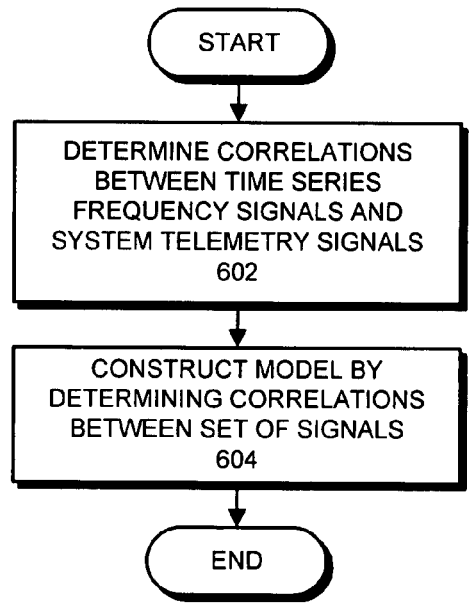
FIG. 6 presents a flow chart illustrating the process of using EMI time series frequency signals and telemetry signals to construct a model of a computer system in accordance with an embodiment of the present invention.

FIG. 6 presents a flow chart illustrating the process of using time series frequency signals and telemetry signals to construct a model of a computer system in accordance with an embodiment of the present invention. The process begins when the system determines correlations between the time series frequency signals and the other system telemetry signals to identify time series frequency signals which are highly correlated with the other telemetry signals (step 602). In one embodiment of the present invention, while determining these correlations, the system uses a non-linear, non-parametric regression technique to determine the correlations. In one embodiment of the present invention, the non-linear, non-parametric regression technique can include a multivariate state estimation technique. The system then constructs the model by determining correlations between a set of signals, wherein the set of signals includes the identified EMI time series frequency signals and the other telemetry signals (step 604).

Figure 7A:
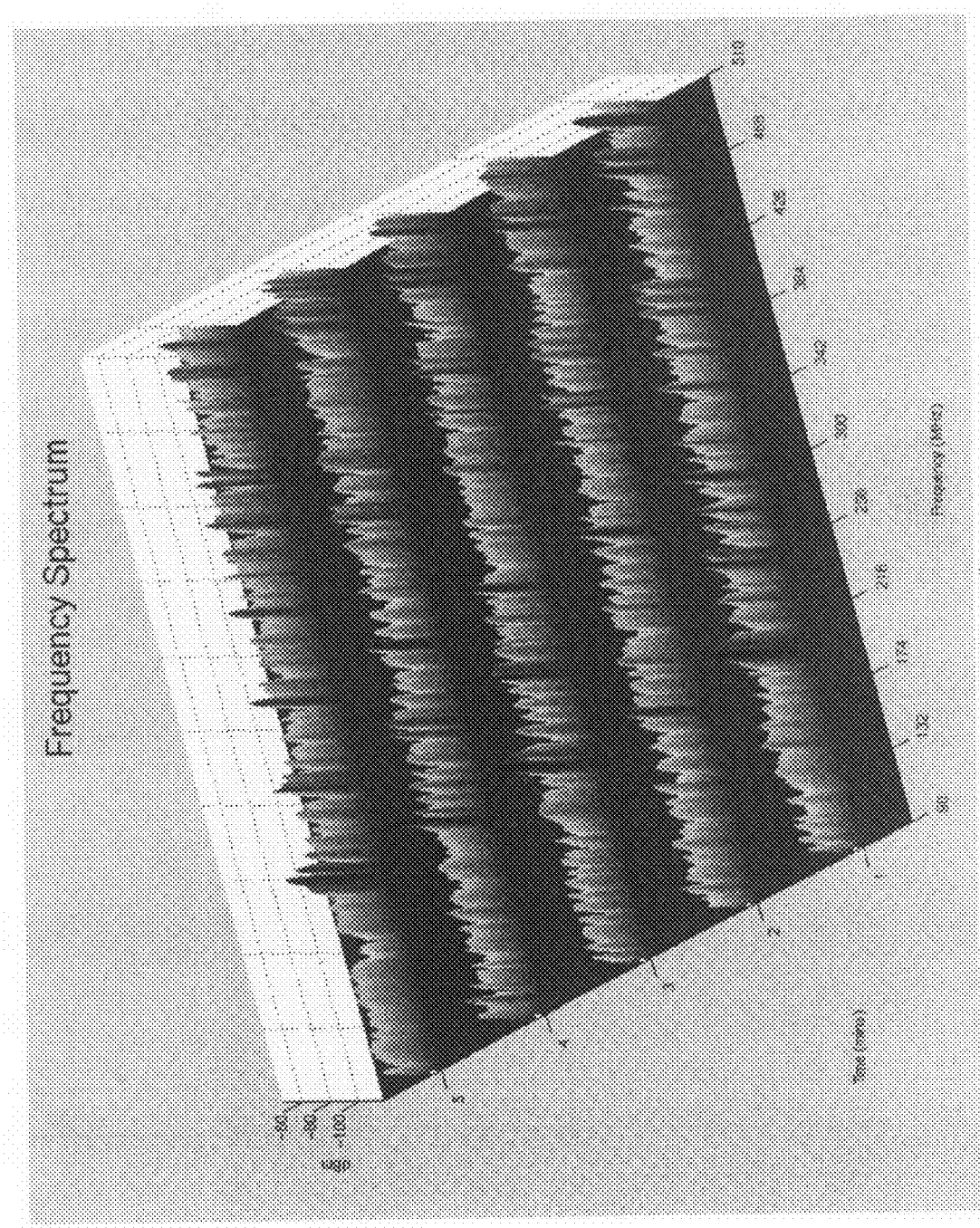
FIG. 7A illustrates a portion of a frequency spectrum corresponding to EMI signals generated by a computer system in accordance with an embodiment of the present invention.
Figure 7B:
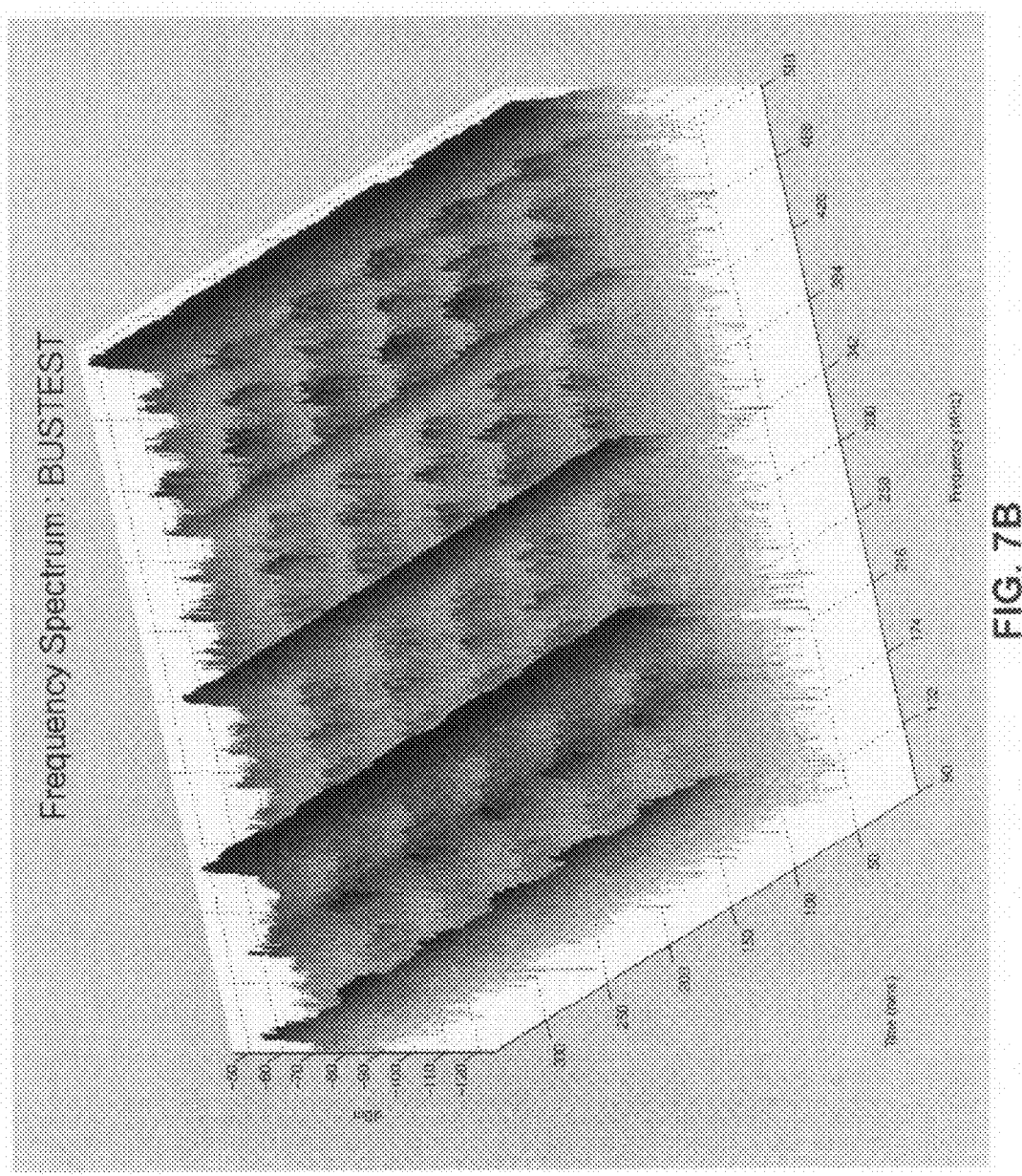
FIG. 7B illustrates a portion of a frequency spectrum corresponding to EMI signals generated by a computer system during execution of an application in accordance with an embodiment of the present invention.
Figure 7C:
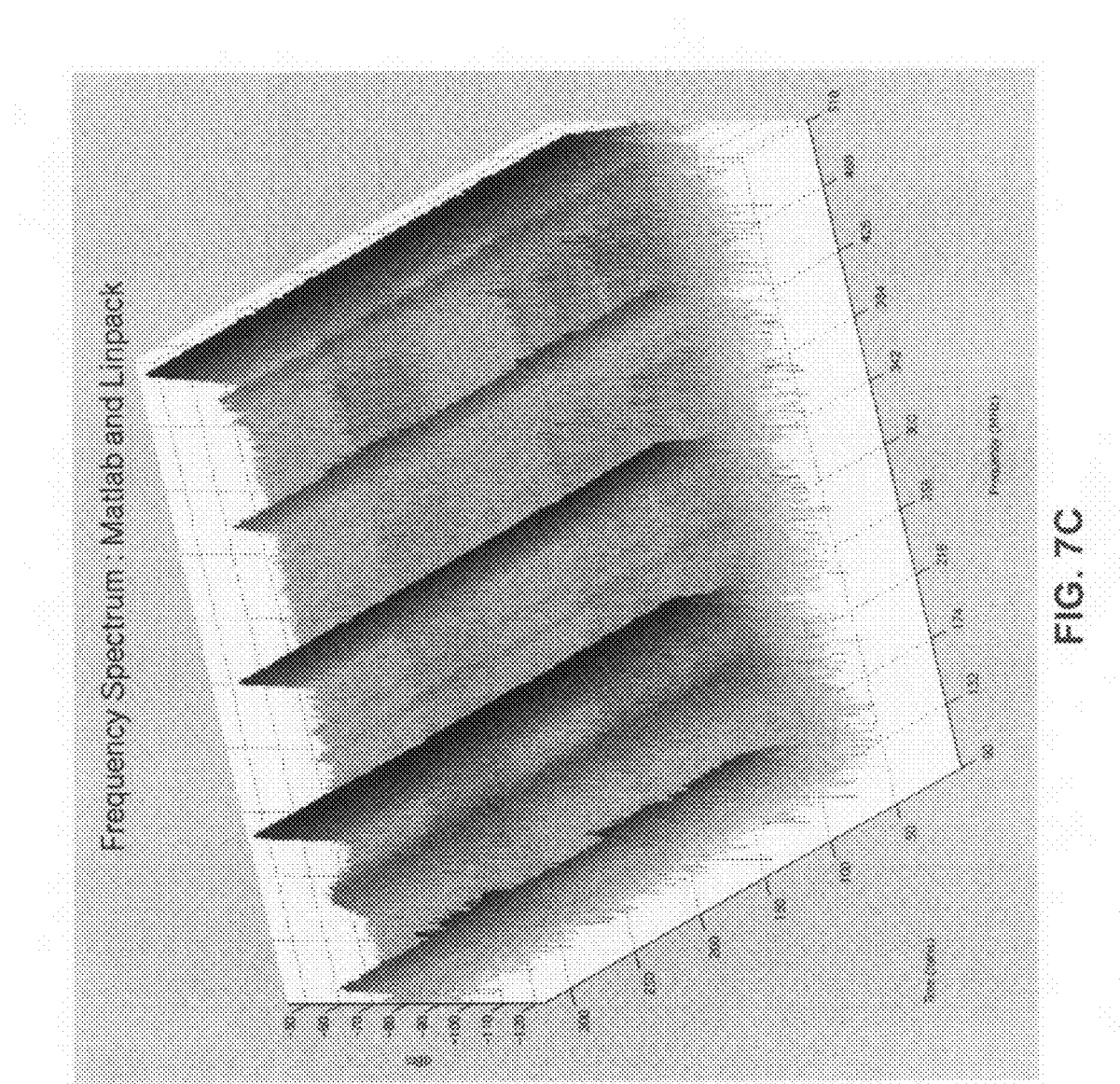
FIG. 7C illustrates a portion of a frequency spectrum corresponding to EMI signals generated by a computer system during execution of another application in accordance with an embodiment of the present invention.

FIGS. 7A-7C illustrate portions of a frequency spectrum corresponding to EMI signals generated by a computer system operating under different loads in accordance with an embodiment of the present invention. Specifically, the frequency spectrum illustrated in FIG. 7B was observed during execution of BUSTEST. Similarly, the frequency spectrum illustrated in FIG. 7C was observed during execution of a Matlab calculation and during a Linpack run.

Figure 7D:
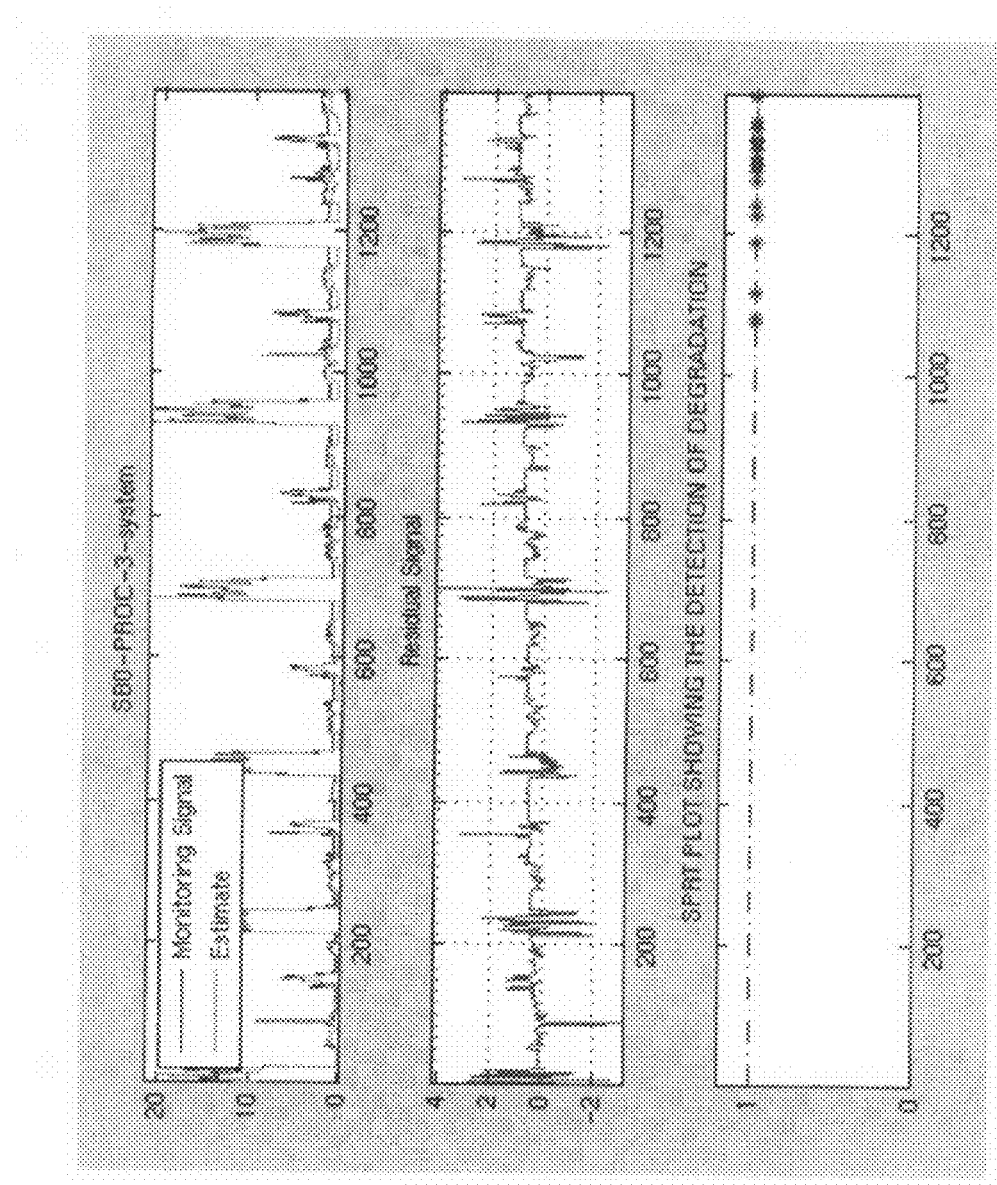
FIG. 7D illustrates a number of signals including: a monitored signal, an estimated signal generated from a model using only telemetry signals, and a residual signal. It also illustrates Sequential Probability Ratio Test (SPRT) alarms for a computer system in accordance with an embodiment of the present invention.

FIG. 7D illustrates a monitored signal, an estimated signal generated from a model using telemetry signals, a residual signal, and Sequential Probability Ratio Test (SPRT) alarms for a computer system in accordance with an embodiment of the present invention.

Figure 7E:
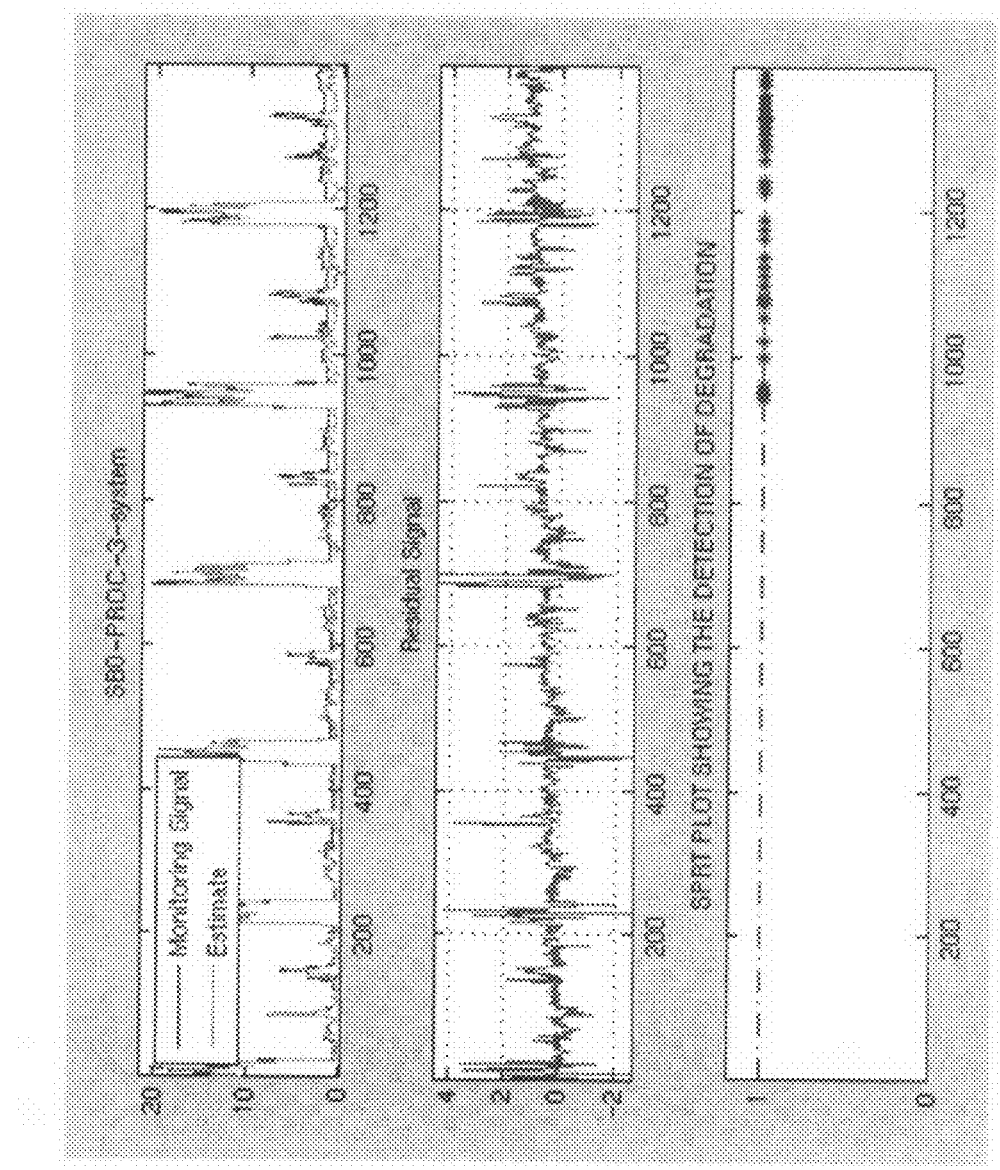
FIG. 7E illustrates a number of signals including: a monitored signal, an estimated signal generated from a model using EMI signals and telemetry signals, and a residual signal. It also illustrates Sequential Probability Ratio Test (SPRT) alarms for a computer system in accordance with an embodiment of the present invention.

FIG. 7E illustrates a monitored signal, an estimated signal generated from a model using EMI signals and telemetry signals, a residual signal, and Sequential Probability Ratio Test (SPRT) alarms for a computer system in accordance with an embodiment of the present invention.

Real-Time Telemetry System

Figure 8:
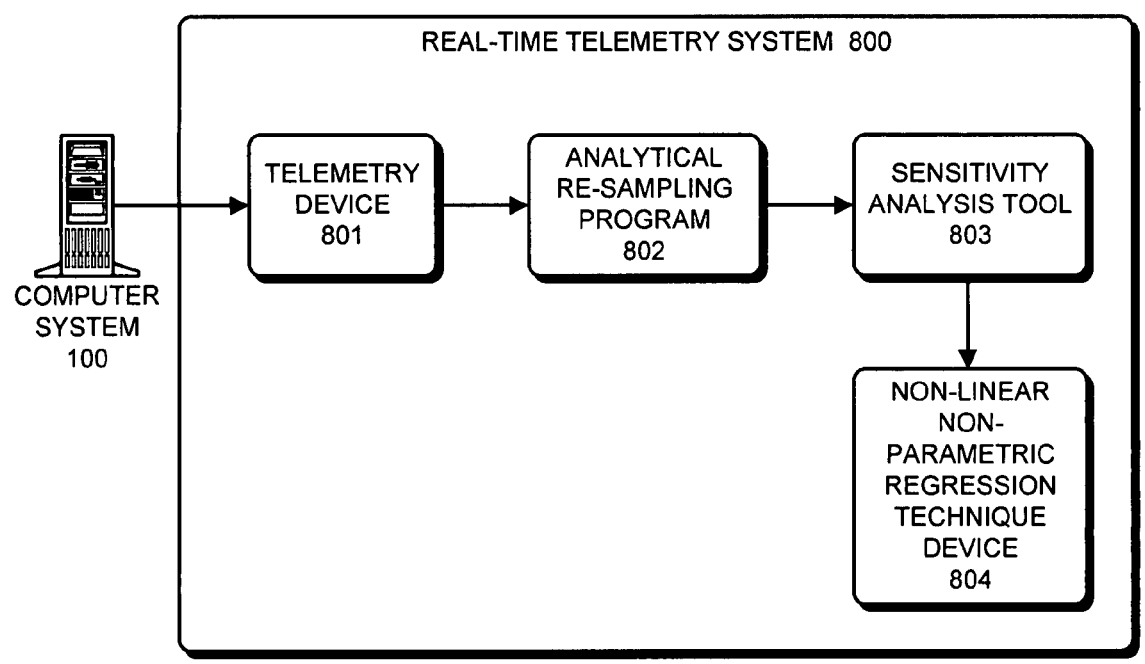
FIG. 8 presents a block diagram of a real-time telemetry system which monitors a computer system in accordance with an embodiment of the present invention.

FIG. 8 presents a block diagram of a real-time telemetry system 800 which monitors computer system 100 in accordance with an embodiment of the present invention. Real-time telemetry system 800 contains telemetry device 801, analytical re-sampling program 802, sensitivity analysis tool 803, and non-linear, non-parametric (NLNP) regression technique device 804. Telemetry device 801 gathers information from the various sensors and monitoring tools within computer system 100, and directs the signals to local or remote locations that contain analytical re-sampling program 802, sensitivity analysis tool 803, and NLNP regression technique device 804. In one embodiment of the present invention, analytical re-sampling program 802, sensitivity analysis tool 803, and NLNP regression technique device 804 are located within computer system 100. In another embodiment of the present invention, analytical re-sampling program 802, sensitivity analysis tool 803, and NLNP regression technique device 804 are located on a plurality of computer systems including computer system 100 and other remote computer systems.

The analytical re-sampling program 802 ensures that the signals have a uniform sampling rate. In doing so, analytical re-sampling program 802 uses interpolation techniques, if necessary, to fill in missing data points, or to equalize the sampling intervals when the raw data is non-uniformly sampled.

After the signals pass through analytical re-sampling program 802, they are aligned and correlated by sensitivity analysis tool 803. For example, in one embodiment of the present invention sensitivity analysis tool 803 incorporates a novel moving window technique that "slides" through the signals with systematically varying window widths. The sliding windows systematically vary the alignment between windows for different signals to optimize the degree of association between the signals, as quantified by an "F-statistic," which is computed and ranked for all signal windows by sensitivity analysis tool 803.

For statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 803.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not contain any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the NLNP regression technique device 804.

Non-Linear, Non-Parametric Regression

In one embodiment of the present invention, the NLNP regression technique is a multivariate state estimation technique (MSET). The term "MSET" as used in this specification refers to a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington DC, Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

The present invention uses an advanced pattern recognition approach, which takes data gathered from software variables reported by the operating system, hardware variables generated by the sensors in the computer system, and a model of a properly-functioning computer system which is generated during a training phase, to determine whether the computer system is at the onset of degradation.

The present invention continuously monitors a variety of instrumentation signals in real time during operation of the server. (Note that although we refer to a single computer system in this disclosure, the present invention also applies to a collection of computer systems).

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include hardware variables, including, but not limited to, internal temperatures, voltages, currents, and fan speeds.

Furthermore, these instrumentation signals can include disk-related metrics for a storage devices such as disk drives, including, but not limited to, average service time, average response time, number of kilobytes (kB) read per second, number of kB written per second, number of read requests per second, number of write requests per second, and number of soft errors per second.

The foregoing instrumentation parameters are monitored continuously with an advanced statistical pattern recognition technique. One embodiment of the present invention uses a class of techniques known as non-linear, non-parametric (NLNP) regression techniques, such as the MSET. Alternatively, the present invention can use other pattern recognition techniques, such as neural networks or other types of NLNP regression. Another embodiment of the present invention uses a linear regression technique. In each case, the pattern recognition module "learns" how the behavior of the monitored variables relates to a properly-functioning computer system. The pattern recognition module then generates a model of the properly-functioning computer system, which is used to determine whether a computer system is at the onset of degradation.

In one embodiment of the present invention, the system components from which the instrumentation signals originate are field replaceable units (FRUs), which can be independently monitored. Note that all major system units, including both hardware and software, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

SPRT (Sequential Probability Ratio Test)

The Sequential Probability Ratio Test is a statistical hypothesis test that differs from standard fixed sample tests. In fixed-sample statistical tests, a given number of observations are used to select one hypothesis from one or more alternative hypotheses. The SPRT, however, examines one observation at a time, and then makes a decision as soon as it has sufficient information to ensure that pre-specified confidence bounds are met.

The basic approach taken by the SPRT technique is to analyze successive observations of a discrete process. Let $y_n$ represent a sample from the process at a given moment $t_n$ in time. In one embodiment of the present invention, the sequence of values $\{Y_n\} = y_0, y_1, \ldots, y_n$ comes from a stationary process characterized by a Gaussian, white-noise probability density function (PDF) with mean 0. (Note that since with the sequence is from a nominally stationary processes, any process variables with a nonzero mean can be first normalized to a mean of zero with no loss of generality).

The SPRT is a binary hypothesis test that analyzes process observations sequentially to determine whether or not the signal is consistent with normal behavior. When a SPRT reaches a decision about current process behavior (i.e. the signal is behaving normally or abnormally), the system reports the decision and continues to process observations.

For each of the eight types of tandem SPRT tests described below, the signal data adheres to a Gaussian PDF with mean 0 and variance $\sigma^2$ for normal signal behavior, referred to as the null hypothesis, $H_0$. The system computes eight specific SPRT hypothesis tests in parallel for each inferential variable monitored. One embodiment of the present invention applies a SPRT to an electrical current time-series. Other embodiments of the present invention apply a SPRT to other inferential variables, including voltage, internal temperature, or stress variables.

The SPRT surveillance module executes all 8 tandem hypothesis tests in parallel. Each test determines whether the current sequence of process observations is consistent with the null hypothesis versus an alternative hypothesis. The first four tests are: (SPRT 1) the positive-mean test, (SPRT 2) the negative-mean test, (SPRT 3) the nominal-variance test, and (SPRT 4) the inverse-variance test. For the positive-mean test, the signal data for the corresponding alternative hypothesis, $H_1$, adheres to a Gaussian PDF with mean +M and variance $\sigma^2$. For the negative-mean test, the signal data for the corresponding alternative hypothesis, $H_2$, adheres to a Gaussian PDF with mean −M and variance $\sigma^2$. For the nominal-variance test, the signal data for the corresponding alternative hypothesis, $H_3$, adheres to a Gaussian PDF with mean 0 and variance $V\sigma^2$ (with scalar factor V). For the inverse-variance test, the signal data for the corresponding alternative hypothesis, $H_4$, adheres to a Gaussian PDF with mean 0 and variance $\sigma^2/V$.

The next two tandem SPRT tests are performed not on the raw inferential variables as above, but on the first difference function of the inferential variable. For discrete time series, the first difference function (i.e. difference between each observation and the observation preceding it) gives an estimate of the numerical derivative of the time series. During uninteresting time periods, the observations in the first difference function are a nominally stationary random process centered about zero. If an upward or downward trend suddenly appears in the signal, SPRTs number 5 and 6 observe an increase or decrease, respectively, in the slope of the inferential variable.

For example, if there is a decrease in the value of the inferential variable, SPRT alarms are triggered for SPRTs 2 and 6. SPRT 2 generates a warning because the sequence of raw observations drops with time. And SPRT 6 generates a warning because the slope of the inferential variable changes from zero to something less than zero. The advantage of monitoring the mean SPRT and slope SPRT in tandem is that the system correlates the SPRT readings from the eight tests and determines if the component has failed. For example, if the signal levels off to a new stationary value (or plateau), the alarms from SPRT 6 cease because the slope returns to zero when the raw signal reaches a plateau. However, SPRT 2 will continue generating a warning because the new mean value of the signal is different from the value prior to the degradation. Therefore, the system correctly identifies that the component has failed.

If SPRTs 3 or 4 generates a warning, the variance of the inferential variable is either increasing or decreasing, respectively. An increasing variance that is not accompanied by a change in mean (inferred from SPRTs 1 and 2 and SPRTs 5 and 6) signifies an episodic event that is "bursty" or "spiky" with time. A decreasing variance that is not accompanied by a change in mean is a common symptom of a failing component that is characterized by an increasing time constant. Therefore, having variance SPRTs available in parallel with slope and mean SPRTs provides a wealth of supplementary diagnostic information.

The final two tandem SPRT tests, SPRT 7 and SPRT 8, are performed on the first difference function of the variance estimates for the inferential variable. The first difference function of the variance estimates is a numerical approximation of the derivative of the sequence of variance estimates. As such, SPRT 7 triggers a warning flag if the variance of the inferential variable is increasing, while SPRT 8 triggers a warning flag if the variance of the inferential variable is decreasing. A comparison of SPRT alarms from SPRTs 3, 4, 7, and 8, gives a great deal of diagnostic information on a class of failure modes known collectively as a "change in gain without a change in mean." For example, if SPRTs 3 and 7 both trigger warning flags, it is an indication that there has been a sudden increase in the variance of the process. If SPRT 3 continues to trigger warning flags but SPRT 7 ceases issuing warning flags, it is an indication that the degradation mode responsible for the increased noisiness has gone to completion. Such information can be beneficial in root causing the origin of the degradation and eliminating it from future product designs.

Similarly, if SPRTs 4 and 8 both start triggering alarms, there is a decrease in variance for the process. If SPRT 4 continues to issue warning flags but SPRT 8 ceases issuing warning flags, it is an indication that the degradation mode has gone to completion. In safety-critical processes, this failure mode (decreasing variance without a change in mean) is dangerous in conventional systems that are monitored only by threshold limit tests. The reason it is dangerous is that a shrinking variance, when it occurs as a result of a transducer that is losing its ability to respond, never trips a threshold limit. (In contrast degradation that manifests as a linear decalibration bias, or even an increasing variance, eventually trips a high or low threshold limit and sounds a warning). A sustained decreasing variance, which happens, for example, when oil-filled pressure transmitters leak their oil, or electrolytic capacitors leak their electrolyte, never trips a threshold in conventional systems, but will be readily detected by the suite of 8 tandem SPRT tests taught in this invention.

The SPRT technique provides a quantitative framework that permits a decision to be made between the null hypothesis and the eight alternative hypotheses with specified misidentification probabilities. If the SPRT accepts one of the alternative hypotheses, an alarm flag is set and data is transmitted.

The SPRT operates as follows. At each time step in a calculation, the system calculates a test index and compares it to two stopping boundaries A and B (defined below). The test index is equal to the natural log of a likelihood ratio ($L_n$), which for a given SPRT is the ratio of the probability that the alternative hypothesis for the test ($H_j$, where j is the appropriate subscript for the SPRT in question) is true, to the probability that the null hypothesis ($H_0$) is true.

$$L_n = \frac{\text{probability of observed sequence } \{Y_n\} \text{ given } H_j \text{ is true}}{\text{probability of observed sequence } \{Y_n\} \text{ given } H_0 \text{ is true}} \quad (1)$$

If the logarithm of the likelihood ratio is greater than or equal to the logarithm of the upper threshold limit [i.e., $\ln(L_n) > \ln(B)$], then the alternative hypothesis is true. If the logarithm of the likelihood ratio is less than or equal to the logarithm of the lower threshold limit [i.e., $\ln(L_n) < \ln(A)$], then the null hypothesis is true. If the log likelihood ratio falls between the two limits, [i.e., $\ln(A) < \ln(L_n) < \ln(B)$], then there is not enough information to make a decision (and, incidentally, no other statistical test could yet reach a decision with the same given Type I and II misidentification probabilities).

Equation (2) relates the threshold limits to the misidentification probabilities $\alpha$ and $\beta$:

$$A = \frac{\beta}{1-\alpha}, \quad B = \frac{1-\beta}{\alpha} \tag{2}$$

where $\alpha$ is the probability of accepting $H_j$ when $H_0$ is true (i.e., the false-alarm probability), and $\beta$ is the probability of accepting $H_0$ when $H_j$ is true (i.e., the missed-alarm probability).

The first two SPRT tests for normal distributions examine the mean of the process observations. If the distribution of observations exhibits a non-zero mean (e.g., a mean of either $+M$ or $-M$, where M is the pre-assigned system disturbance magnitude for the mean test), the mean tests determine that the system is degraded. Assuming that the sequence $\{Y_n\}$ adheres to a Gaussian PDF, then the probability that the null hypothesis $H_0$ is true (i.e., mean 0 and variance $\sigma^2$) is:

$$P(y_1, y_2, \ldots, y_n \mid H_0) = \frac{1}{(2\pi\sigma^2)^{n/2}} \exp\left[-\frac{1}{2\sigma^2}\sum_{k=1}^{n} y_k^2\right] \tag{3}$$

Similarly, the probability for alternative hypothesis $H_1$ is true (i.e. mean M and variance $\sigma^2$) is:

$$P(y_1, y_2, \ldots, y_n \mid H_1) = \tag{4}$$

$$\frac{1}{(2\pi\sigma^2)^{n/2}} \exp\left[-\frac{1}{2\sigma^2}\left(\sum_{k=1}^{n} y_k^2 - 2\sum_{k=1}^{n} y_k M + \sum_{k=1}^{n} M^2\right)\right]$$

The ratio of the probabilities in (3) and (4) gives the likelihood ratio $L_n$ for the positive-mean test:

$$L_n = \exp\left[-\frac{1}{2\sigma^2}\sum_{k=1}^{n} M(M - 2y_k)\right] \tag{5}$$

Taking the logarithm of likelihood ratio given by (5) produces the SPRT index for the positive-mean test ($SPRT_{pos}$):

$$SPRT_{pos} = -\frac{1}{2\sigma^2}\sum_{k=1}^{n} M(M - 2y_k) = \frac{M}{\sigma^2}\sum_{k=1}^{n}\left(y_k - \frac{M}{2}\right) \tag{6}$$

The SPRT index for the negative-mean test ($SPRT_{neg}$) is derived by substituting $-M$ for each instance of M in (4) through (6) above, resulting in:

$$SPRT_{neg} = \frac{M}{\sigma^2}\sum_{k=1}^{n}\left(-y_k - \frac{M}{2}\right) \tag{7}$$

The remaining two SPRT tests examine the variance of the sequence. This capability gives the SPRT module the ability to detect and quantitatively characterize changes in variability for processes, which is vitally important for 6-sigma QA/QC improvement initiatives. In the variance tests, the system is degraded if the sequence exhibits a change in variance by a factor of V or 1/V, where V, the pre-assigned system disturbance magnitude for the variance test, is a positive scalar. The probability that the alternative hypothesis $H_3$ is true (i.e., mean 0 and variance $V\sigma^2$) is given by (3) with $\sigma^2$ replaced by $V\sigma^2$:

$$P(y_1, y_2, \ldots, y_n \mid H_0) = \frac{1}{(2\pi V\sigma^2)^{n/2}} \exp\left[-\frac{1}{2V\sigma^2}\sum_{k=1}^{n} y_k^2\right] \tag{8}$$

The likelihood ratio for the variance test is given by the ratio of (8) to (3):

$$L_n = V^{-n/2} \exp\left[-\frac{1}{2\sigma^2}\frac{1-V}{V}\sum_{k=1}^{n} y_k^2\right] \tag{9}$$

Taking the logarithm of the likelihood ratio given in (9) produces the SPRT index for the nominal-variance test ($SPRT_{nom}$):

$$SPRT_{nom} = \frac{1}{2\sigma^2}\left(\frac{V-1}{V}\right)\sum_{k=1}^{n} y_k^2 - \frac{n}{2}\ln V \tag{10}$$

The SPRT index for the inverse-variance test ($SPRT_{inv}$) is derived by substituting 1/V for each instance of V in (8) through (10), resulting in:

$$SPRT_{inv} = \frac{1}{2\sigma^2}(1-V)\sum_{k=1}^{n} y_k^2 + \frac{n}{2}\ln V \tag{11}$$

The tandem SPRT module performs mean, variance, and SPRT tests on the raw process signal and on its first difference function. To initialize the module for analysis of an inferential variable time-series, the user specifies the system disturbance magnitudes for the tests (M and V), the false-alarm probability ($\alpha$), and the missed-alarm probability ($\beta$).

Then, during the training phase (before the first failure of a component under test), the module calculates the mean and variance of the monitored variable process signal. For most inferential variables the mean of the raw observations for the inferential variable will be nonzero; in this case the mean calculated from the training phase is used to normalize the signal during the monitoring phase. The system disturbance magnitude for the mean tests specifies the number of standard deviations (or fractions thereof) that the distribution must shift in the positive or negative direction to trigger an alarm.

The system disturbance magnitude for the variance tests specifies the fractional change of the variance necessary to trigger an alarm.

At the beginning of the monitoring phase, the system sets all eight SPRT indices to 0. Then, during each time step of the calculation, the system updates the SPRT indices using (6), (7), (10), and (11). The system compares each SPRT index is then compared to the upper [i.e., $\ln((1-\beta)/\alpha]$ and lower [i.e., $\ln((\beta/(1-\alpha))]$ decision boundaries, with these three possible outcomes:

1. the lower limit is reached, in which case the process is declared healthy, the test statistic is reset to zero, and sampling continues;
2. the upper limit is reached, in which case the process is declared degraded, an alarm flag is raised indicating a sensor or process fault, the test statistic is reset to zero, and sampling continues; or
3. neither limit has been reached, in which case no decision concerning the process can yet be made, and the sampling continues.

The advantages of using a SPRT are twofold:
1. early detection of very subtle anomalies in noisy process variables; and
2. pre-specification of quantitative false-alarm and missed-alarm probabilities.

The present invention uses tandem SPRTs to monitor "derivative SPRTs" in parallel with mean and variance SPRTs that are performed on the time-series associated an inferential variable. The new tandem-SPRT approach facilitates determining the onset of hardware degradation for components under test as well as the exact time of failure (within the resolution of the time samples for the inferential variable). Moreover, the onset of "spiky" degradation in components as well as degradation in the sensor that is used to measure the inferential variable can be deduced. Information from the suite of eight tandem SPRTs provides a substantially complete and substantially accurate picture of the dynamic reliability of the components.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for monitoring electromagnetic interference (EMI) signals to facilitate proactive fault monitoring in a computer system, comprising:
    receiving at an analysis mechanism EMI signals from one or more antennas located in close proximity to the computer system;
    using a Fast Fourier Transform (FFT) to convert the received signals to the frequency domain;
    converting the output of the FFT into time series frequency signals for different frequencies;
    determining correlations between the time series frequency signals and other system telemetry signals to identify time series frequency signals which are highly correlated with the other telemetry signals;
    constructing a model during a training phase by determining correlations between a set of signals, wherein the set of signals includes the identified time series frequency signals and the other telemetry signals; and
    comparing the time series frequency signals with corresponding estimated time series signals produced by the model to detect anomalies during a monitoring phase.

2. The method of claim 1, wherein the determining the correlations involves using a non-linear, non-parametric regression technique.

3. The method of claim 2, wherein the non-linear, non-parametric regression technique can include a multivariate state estimation technique.

4. The method of claim 1, wherein comparing the time series frequency signals with corresponding estimated time series signals during the monitoring phase involves using sequential detection techniques to detect anomalies.

5. The method of claim 4, wherein the sequential detection techniques include the Sequential Probability Ratio Test (SPRT).

6. The method of claim 1, wherein the other system telemetry signals can include:
    internal performance signals containing parameters maintained by software within the computer system;
    physical performance signals measured through sensors located in proximity to the computer system; and
    canary performance signals containing parameters associated with synthetic user transactions periodically generated for performance measuring purposes.

7. A computer-readable storage medium storing instructions that when executed by a computer cause the computer to perform a method for monitoring electromagnetic interference (EMI) signals to facilitate proactive fault monitoring in a computer system, the method comprising:
    receiving EMI signals from one or more antennas located in close proximity to the computer system;
    using a Fast Fourier Transform (FFT) to convert the received signals to the frequency domain;
    converting the output of the FFT into time series frequency signals for different frequencies;
    determining correlations between the time series frequency signals and other system telemetry signals to identify time series frequency signals which are highly correlated with the other telemetry signals;
    constructing a model during a training phase by determining correlations between a set of signals, wherein the set of signals includes the identified time series frequency signals and the other telemetry signals; and
    comparing the time series frequency signals with corresponding estimated time series signals produced by the model to detect anomalies during a monitoring phase.

8. The computer-readable storage medium of claim 7, wherein the determining the correlations involves using a non-linear, non-parametric regression technique.

9. The computer-readable storage medium of claim 8, wherein the non-linear, non-parametric regression technique can include a multivariate state estimation technique.

10. The computer-readable storage medium of claim 7, wherein comparing the time series frequency signals with corresponding estimated time series signals during the monitoring phase involves using sequential detection techniques to detect anomalies.

11. The computer-readable storage medium of claim 10, wherein the sequential detection techniques include the Sequential Probability Ratio Test (SPRT).

12. The computer-readable storage medium of claim 7, wherein the other system telemetry signals can include:
    internal performance signals containing parameters maintained by software within the computer system;
    physical performance signals measured through sensors located in proximity to the computer system; and canary performance signals containing parameters associated with synthetic user transactions periodically generated for performance measuring purposes.

13. An apparatus that monitors electromagnetic interference (EMI) signals to facilitate proactive fault monitoring in a computer system, comprising:
one or more antennas located in close proximity to the computer system wherein the one or more antennas are configured to receive EMI signals from the computer system; and
an analysis mechanism coupled to the one or more antennas, wherein the analysis mechanism is configured to
use a Fast Fourier Transform (FFT) to convert the received signals to the frequency domain;
convert the output of the FFT into time series frequency signals for different frequencies;
determine correlations between the time series frequency signals and the other system telemetry signals to identify time series frequency signals which are highly correlated with the other telemetry signals;
construct the model by determining correlations between a set of signals, wherein the set of signals includes the identified time series frequency signals and the other telemetry signals; and
compare the time series frequency signals with corresponding estimated time series signals produced by the model to detect anomalies during a monitoring phase.

* * * * *